United States Patent [19]

Allen

[11] Patent Number: 4,820,246

[45] Date of Patent: Apr. 11, 1989

[54] PULLEY CONSTRUCTION, DRIVE SYSTEM UTILIZING THE SAME AND METHODS OF MAKING THE SAME

[75] Inventor: Michael E. Allen, Morrisville, Mo.

[73] Assignee: Dayco Products, Inc., Dayton, Ohio

[21] Appl. No.: 99,174

[22] Filed: Sep. 21, 1987

[51] Int. Cl.$^4$ .................. F16H 55/36; F16H 55/48
[52] U.S. Cl. ........................ 474/174; 29/159 R; 474/190
[58] Field of Search ................ 474/166–168, 474/170, 171, 174, 184, 187, 903, 190–194; 29/159 R, 159.3

[56] References Cited

U.S. PATENT DOCUMENTS

| | | | |
|---|---|---|---|
| 2,674,897 | 4/1954 | Heinish | 474/94 |
| 3,788,155 | 1/1974 | Cigala et al. | 474/177 |
| 4,366,609 | 1/1983 | Speer | 29/159 R |
| 4,402,678 | 9/1983 | St John | 474/171 |
| 4,473,363 | 9/1984 | McCutchen, Jr. | 474/161 |
| 4,600,333 | 7/1986 | Rohrig et al. | 474/903 X |

Primary Examiner—Thuy M. Bui
Attorney, Agent, or Firm—Joseph V. Tassone

[57] ABSTRACT

A pulley construction, drive system utilizing the pulley construction and method of making the pulley construction are provided, the pulley construction being utilized with an endless drive belt and comprising a body member having a peripheral groove therein for receiving part of the belt therein and having a securing unit, and a hub member having a securing unit secured to the securing unit of the body member so as to hold the members in aligned assembled relation to rotate in unison, the hub member having structure for being interconnected to a shaft so that the pulley construction and the shaft will be adapted to rotate in unison, the securing units are so constructed and arranged that the securing unit of one of the members has as part thereof that is adapted to break away from the one member under a certain normal driving force of the belt when the shaft is prevented from rotating so as to permit relative rotational movement between the members while the securing units maintain the thus relatively rotatable members in the aligned assembled relation thereof.

20 Claims, 3 Drawing Sheets

PULLEY CONSTRUCTION, DRIVE SYSTEM UTILIZING THE SAME AND METHODS OF MAKING THE SAME

BACKGROUND OF THE INVENTION

1. Field of the Invention

This invention relates to a new pulley construction for use with an endless drive belt means and to a method of making the same, as well as to a new drive system utilizing such a pulley construction.

2. Prior Art Statement

It is known to provide a pulley construction for use with an endless drive belt means, the pulley construction comprising a body member having a peripheral groove means therein for receiving part of the belt means therein and having securing means, and a hub member having securing means secured to the securing means of the body member so as to hold the members in aligned assembled relation to rotate in unison, the hub member having means for being interconnected to a shaft means so that the pulley construction and the shaft means will be adapted to rotate in unison. For example, see the U.S. Pat. to Heinish, No. 2,674,897, the U.S. Pat. to Cigala et al, No. 3,788,155, the U.S. Pat. to Speer, No. 4,366,609, the U.S. Pat. to St. John, No. 4,402,678 and the U.S. Pat. to McCutchan, Jr., No. 4,473,363.

SUMMARY OF THE INVENTION

It is one feature of this invention to provide a new pulley construction for use with an endless drive belt means wherein the body member of the belt construction will continue to operate in the drive system even though a component that was to be driven by that pulley construction has failed in a manner that tends to prevent rotation of the shaft means thereof.

In particular, it was found according to the teachings of this invention that when a component of a belt drive system seizes so that the endless belt means cannot rotate the same through a pulley construction that is interconnected to the shaft means thereof, the entire drive system is prevented from operating properly.

Therefore, it is believed according to the teachings of this invention that a pulley construction can be so constructed and arranged that the body member thereof can break away from the hub member thereof under a certain normal driving force of the belt means if the hub member is prevented from rotating in unison therewith whereby the body member can be driven by the belt means relative to the hub member.

For example, one embodiment of this invention provides a pulley construction for use with an endless drive belt means, the pulley construction comprising a body member having a peripheral groove means therein for receiving part of the belt means therein and having securing means, and a hub member having securing means secured to the securing means of the body member so as to hold the members in aligned assembled relation to rotate in unison, the hub member having means for being interconnected to a shaft means so that the pulley construction and the shaft means will be adapted to rotate in unison, the securing means being so constructed and arranged that the securing means of one of the members has a part thereof that is adapted to break away from the one member under a certain normal driving force of the belt means when the shaft means is prevented from rotating so as to permit relative rotational movement between the members while the securing means maintains the thus relatively rotatable members in the aligned assembled relation thereof.

Accordingly, it is an object of this invention to provide a new pulley construction for use with an endless drive belt means, the pulley construction of this invention having one or more of the novel features of this invention as set forth above or hereinafter shown or described.

Another object of this invention is to provide a new drive system utilizing such a pulley construction, the drive system of this invention having one or more of the novel features of this invention as set forth above or hereinafter shown or described.

Another object of this invention is to provide a new method of making such a pulley construction, the method of this invention having one or more of the novel features of this invention as set forth above or hereinfter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
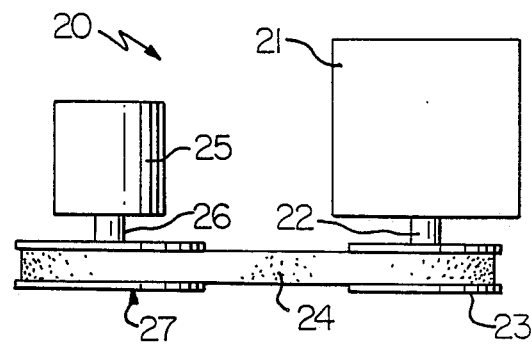
FIG. 1 is a top view of the drive system of this invention.

While the various features of this invention are hereinafter illustrated and described as being particularly adapted to provide a pulley construction for use in a drive system for the components of an internal combustion engine of a transportation vehicle, it is to be understood that the various features of this invention can be utilized singly or in various combinations thereof to provide a pulley construction for use in the drive systems of other types of apparatus as desired.

Therefore, this invention is not to be limited to only the embodiments illustrated in the drawings, because the drawings are merely utilized to illustrate one of the wide variety of uses of this invention.

Figure 2:
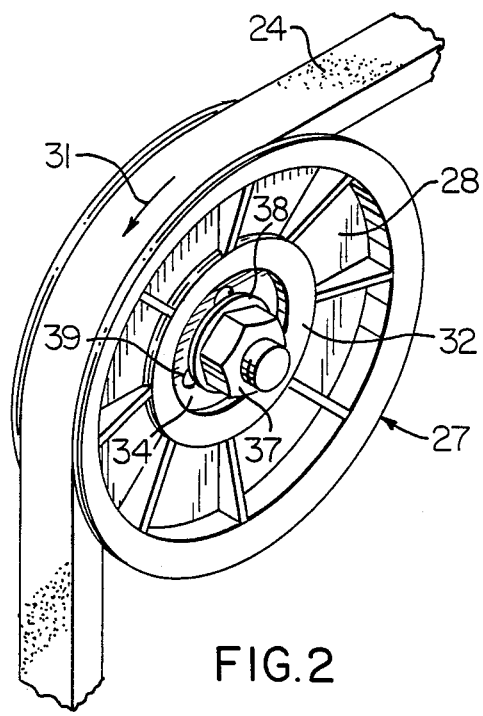
FIG. 2 is an enlarged fragmentary perspective view of a part of the drive system of FIG. 1 and illustrates the one embodiment of the new pulley construction of this invention.
Figure 3:
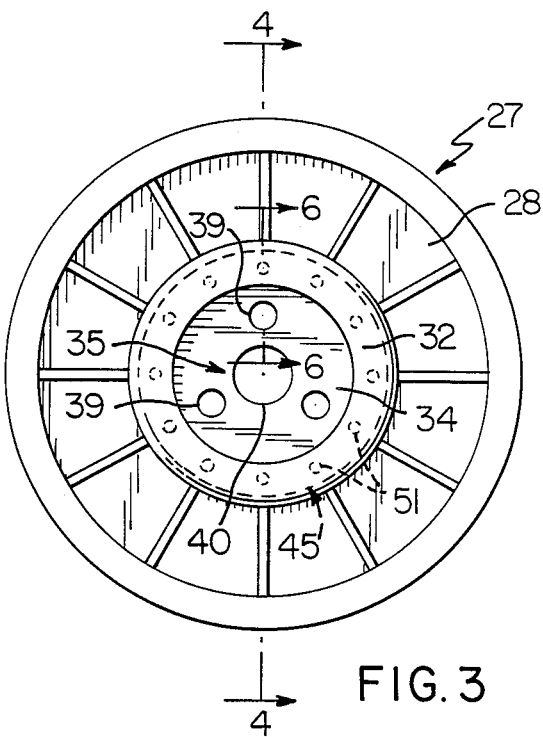
FIG. 3 is a front view of the pulley construction of FIG. 2.
Figure 4:
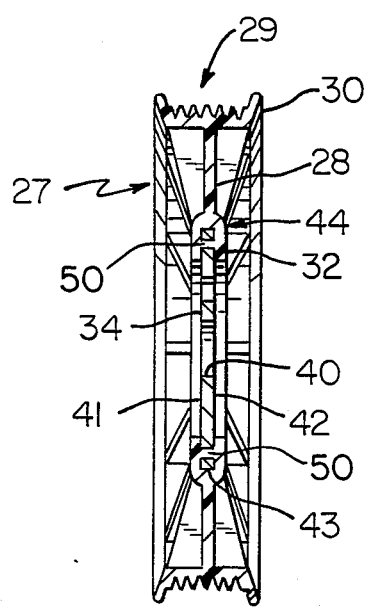
FIG. 4 is a cross-sectional view taken on line 4—4 of FIG. 3.

Referring now to FIGS. 1 and 2, the new drive system of this invention is generally indicated by the reference numeral 20 and comprises a drive means 21 having an output shaft 22 that rotatably drives a pulley construction 23 in a conventional manner so that the drive pulley 23 will move an endless belt means 24 through an endless path and thereby rotatably drive components of the system 20, such as the component 25 that has its shaft means 26 interconnected to a pulley construction 27 of this invention that is driven by the endless belt means 24 in a conventional manner.

For example, the drive system 20 can be utilized on an internal combustion engine (not shown) of a transportation vehicle wherein the drive means 21 is provided by the internal combustion engine thereof and the component 25 could be an air pump, an alternator, water pump etc, of the arrangement, the drive system 20 obviously including one or more components 25 to be driven by the same belt means 24 in a manner conventional in the art.

As previously stated, it is one feature of this invention to provide the pulley construction 27 of this invention with means that permits the system 20 to continue to operate in substantially a normal manner even though the component 25 should fail in some manner so that the shaft means 26 thereof cannot rotate. For example, the component 25 may seize, have a bearing failure or otherwise lock up so that a non-modified pulley construction could not be rotatably driven by the belt means 24 even though the drive means 21 is continuously operating to drive the belt means 24 in a continuous manner whereby the belt means 24 would rub on the thus non-rotating pulley construction.

The pulley construction 27 of this invention accomplishes the above continuously operating feature by unique structure thereof now to be described.

The pulley construction 27 of this invention comprises a body member 28 that has a peripheral groove means 29 formed in the outer peripheral portion 30 thereof for receiving part of the endless belt means 24 therein for rotating the pulley construction 27 as the belt means 24 is being continuously moved by the drive means 21, such as in the direction of the arrow 31 in FIG. 2.

The body member 28 of the pulley construction 27 has an inner peripheral portion 32 that is secured to an outer peripheral portion 33 of a hub member 34 of the pulley construction 27 in a manner hereinafter set forth so that the members 28 and 34 are adapted to normally rotate in unison.

The hub member 34 is provided with means 35 in the inner peripheral portion 36 thereof for securing to the shaft means 26, such as by the nut 37 and washer 38 arrangement illustrated in FIG. 2 or through suitable bolt openings 39 in a conventional manner, the shaft means 26 projecting through a central opening 40 in the hub member 34 in a conventional manner.

In any event, the shaft means 26 is adapted to be interconnected to the inner peripheral portion 36 of the hub member 34 so that as the pulley construction 27 is rotated by the moving belt means 24, the shaft means 26 will rotate in unison therewith and thereby drive the driven component 25.

While the body member 28 and hub member 34 of the pulley construction 27 of this invention can be formed of any suitable material in any suitable manner, the body member 28 is formed of polymeric material, such as a rigid plastic material, that is molded to the hub member 34 in the configuration thereof as illustrated in the drawings while the hub member 34 comprises a substantially flat metal plate that has opposed flat sides 41 and 42 that are disposed parallel to each other and respectively terminate at an outer peripheral edge means 43 of the hub member 34 that is substantially circular and concentric to the central opening 40 thereof as illustrated.

The body member 28 has securing means that is generally indicated by the reference numeral 44 and is secured to securing means 45 of the hub member 34 so that normally the body member 28 and hub member 34 are adapted to rotate in unison. However, the securing means 44 and 45 are so constructed and arranged in a manner hereinafter set forth that should the shaft means 26 seize or otherwise prevent the pulley construction 27 from rotating in a normal manner during a normal driving operation of the belt means 24 by the drive means 21, at least one of the securing means 44 or 45 will break away so as to permit the body member 28 to freely rotate on the non-rotating hub member 34 in aligned assembled relation therewith and thereby permit the drive system 20 to keep functioning in substantially a normal manner even though the component 25 is in a failed condition thereof so that the belt means 24 can continue to drive the other components of the system 20 as previously set forth and not have the belt means rub on a non-rotating pulley construction.

Figure 6:
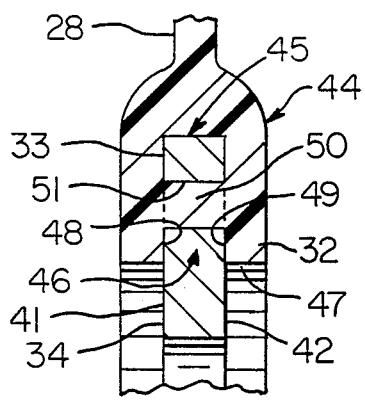
FIG. 6 is an enlarged fragmentary cross-sectional view taken on line 6—6 of FIG. 3.

The securing means 44 of the body member 28 comprises an internal peripheral slot means that is generally indicated by the reference numeral 46 in FIG. 6 and interrupts the internal peripheral edge 47 thereof to define spaced apart facing sides 48 and 49 that are disposed against the facing sides 41 and 42 of the outer peripheral portion 33 of the hub member 34 so as to hold the hub member 34 in aligned relation therewith but being adapted to slide relative thereto as will be apparent hereinafter. However, the securing means 44 of the body member 28 also comprises a plurality of parts 50 of the body member 28 that respectively project through a plurality of spaced apart openings 51 of the hub member 34 which extend through the opposed sides 41 and 42 thereof at the outer peripheral portion 33 thereof and comprise the securing means 45 thereof, the parts 50 being formed at the same time that the body member 28 is being molded on the hub member 34.

In this manner, the parts 50 of the body member 28 are normally integral and one-piece therewith and because the same are disposed in the openings 51 of the hub member 34, the parts 50 cause the hub member 34 to move in unison with the body member 28 during the normal operation of the pulley construction 27.

Figure 7:
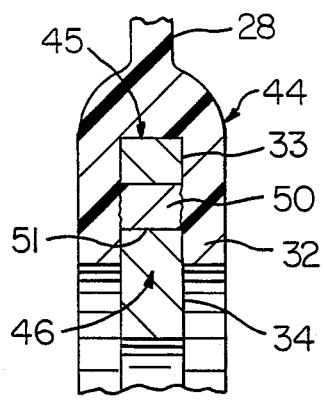
FIG. 7 is a view similar to FIG. 6 and illustrates the pulley construction after the body member has its securing means broken away by the securing means of the hub member.
Figure 8:
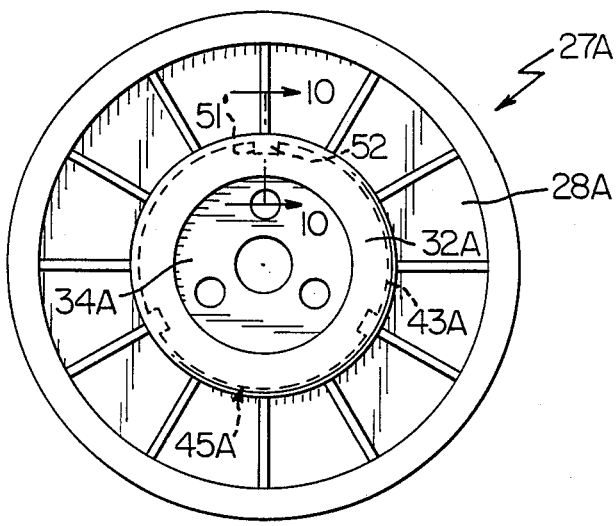
FIG. 8 is a view similar to FIG. 3 and illustrates another embodiment of the pulley construction of this invention.

However, it is believed that the size and number of the openings 51 as well as the particular material forming the body member 28 can be so selected that when the component 25 of the pulley construction 27 seizes or otherwise causes the shaft means 26 thereof to stop rotating even though the drive system 21 is moving the endless belt 24 in a normal driving manner thereof, the normal driving force of the belt means 24 will cause the hub member 28 to have the parts 50 thereof shear away from the inner peripheral portion 32 thereof in the manner illustrated in FIG. 7 and thereby now only be carried in the openings 51 of the hub member 34 so that the body member 28 can rotate relative to the hub member 34 and remain in aligned assembled relation therewith as the body member 28 maintains the outer peripheral portion 33 of the hub member 34 within the slot means 46 thereof as illustrated so that the body member 28 can freely rotate on the now non-rotating hub member 34 and thereby permit substantially normal operation of the drive system 20.

Figure 5:
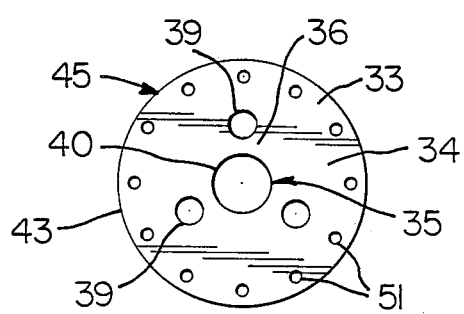
FIG. 5 is a front view of the hub member of the pulley construction of FIG. 3.

While the securing means 45 of the hub member 34 is illustrated as a plurality of opening means 51 disposed in a spaced apart circular array thereof and each having a substantially circular configuration as illustrated in FIG. 5, it is to be understood that the securing means 44 and 45 of the body member 28 and hub member 34 can be of other configurations and in other locations to perform in the manner previously set forth.

For example, another pulley construction of this invention is generally indicated by the reference numeral 27A in FIGS. 8–11 and parts thereof similar to the pulley construction 27 previously described are indicated by like reference numerals followed by the reference letter "A".

Figure 9:
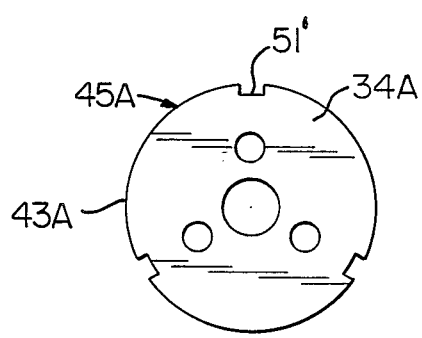
FIG. 9 is a front view of the hub member of the pulley construction of FIG. 8.

As illustrated in FIGS. 8–11, the pulley construction 27A is formed of the body member 28A and the hub member 34A with each being formed in substantially the same manner as the body member 28 and hub member 34 as previously set forth. However, the securing means 45A of the hub member 34A comprises a plurality of notches 51' that interrupt the outer peripheral edge 43A thereof, the number of notches 51' being any suitable number thereof and being uniformly spaced apart as illustrated in FIG. 9.

Figure 10:
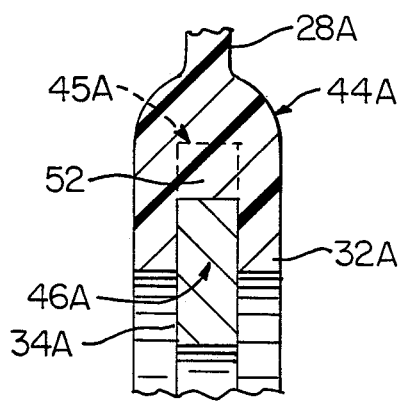
FIG. 10 is an enlarged fragmentary cross-sectional view taken on line 10—10 of FIG. 8.

In this manner, the interconnecting or securing means 44A of the body member 28A comprises a plurality of parts 52 that normally extend into the notches 51' and are integral and one-piece with the inner peripheral portion 32A of the body member 28A as illustrated in FIG. 10, the parts 52 having been formed into the notches 51' at the same time that the body member 28A is being molded on the hub member 34A.

Figure 11:
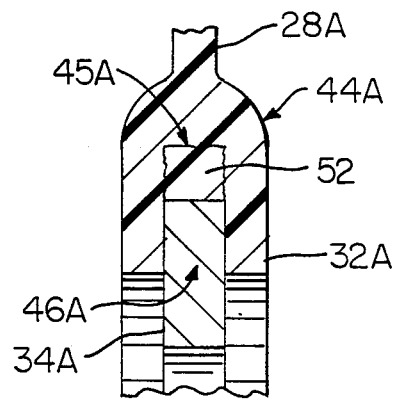
FIG. 11 is a view similar to FIG. 10 and illustrates the pulley construction after the securing means of the body member has been broken away by the securing means of the hub member.
Figure 12:
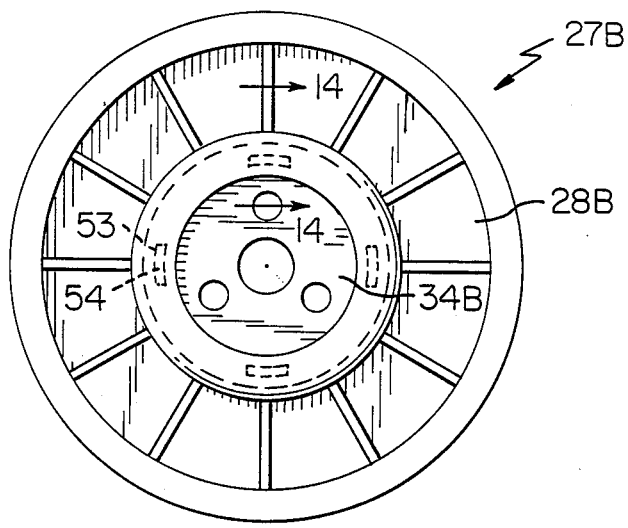
FIG. 12 is a view similar to FIG. 3 and illustrates another embodiment of the pulley construction of this invention.
Figure 13:
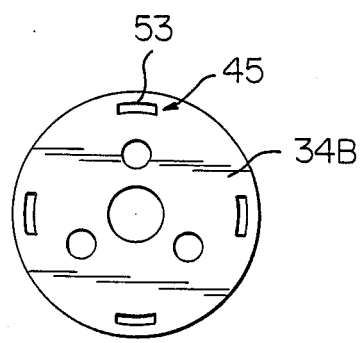
FIG. 13 is a front view of the hub member of the pulley construction of FIG. 12.

However, when the hub member 34A is prevented from rotating in unison with the body member 28A for the reasons previously set forth, the parts 52 of the body member 28A break away from the same and are carried in the notches 51' of the hub member 34A as illustrated in FIG. 11 so that the body member 28A can freely rotate relative to the non-rotating hub member 34A in aligned relation therewith as the hub member 34A remains in the slot 46A of the body member 28A as illustrated.

Another pulley construction of this invention is generally indicated by the reference numeral 27B in FIGS. 12–15 and parts thereof similar to the parts of the pulley construction 27 previously described are indicated by like reference numerals followed by the reference letter "B".

Figure 14:
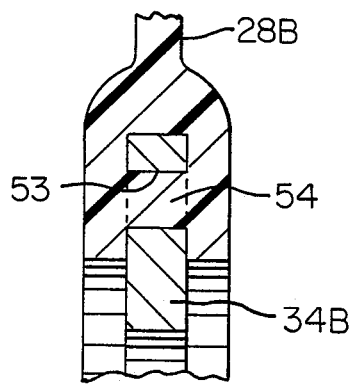
FIG. 14 is an enlarged fragmentary cross-sectional view taken on line 14—14 of FIG. 12.
Figure 15:
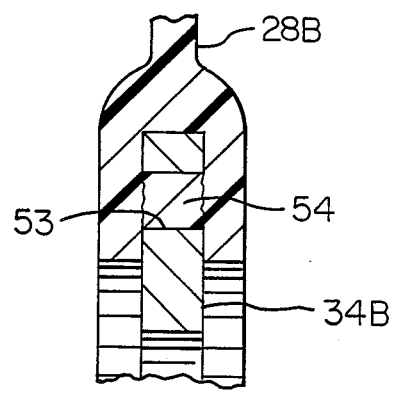
FIG. 15 is a view similar to FIG. 14 and illustrates the pulley construction after the securing means of the body member has been broken away by the securing means of the hub member.

The pulley construction 27B of FIGS. 12–15 is substantially the same as the pulley construction 27 previously described except that the securing means 45B of the hub member 34B comprise elongated substantially rectangular openings 53 that are arcuate and disposed in the spaced apart circular array thereof and respectively receive integral parts 54 of the body member 28B therein in the manner illustrated in FIG. 14 so that the parts 54 are adapted to shear away from the hub member 34B and permit the body member 28B to rotate relative thereto in the manner illustrated in FIG. 15 for the reasons previously set forth.

Therefore, it can be seen that the securing means of the body member and hub member of the pulley construction of this invention can take various forms thereof which readily permit the body member to break away from the hub member under a certain normal driving force of a belt means when the shaft means carrying the hub member is prevented from rotating so as to permit relative rotational movement between the body member and the hub member while the securing means thereof maintains the relatively rotatable members in the aligned assembled relation thereof.

While each pulley construction of this invention has been illustrated and described as having a part of the securing means of the body member be broken away by the hub member, it is to be understood that the hub member could have a part of the securing means thereof break away from the body member or that both securing means of the body member and the hub member could be arranged to break away to permit the body member to rotate on the hub member, as desired.

Also, while the pulley construction 27 has been described as being a driven pulley construction so that the body member breaks away from the hub thereof when the hub member is prevented from rotating, it is to be understood that should a pulley construction of this invention be utilized as a drive pulley construction, the hub member thereof is adapted to break away from the body member thereof should the body member thereof be prevented from rotating so that the hub member can rotate relative to the now stationary body member for the reasons previously set forth.

Therefore, it can be seen that this invention not only provides a new pulley construction for use with an endless drive belt means and to a new method of making such a pulley construction, but also this invention provides a new drive system utilizing such a pulley construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a pulley construction for use with an endless drive belt means, said pulley construction comprising a body member having a peripheral groove means therein for receiving part of said belt means therein and having securing means, and a hub member having securing means secured to said securing means of said body member so as to hold said members in aligned assembled relation to rotate in unison, said hub member having means for being interconnected to a shaft means so that said pulley construction and said shaft means will be adapted to rotate in unison, the improvement wherein said securing means are so constructed and arranged that said securing means of one of said members has a part thereof that is adapted to break away from said one member under a certain normal driving force of said belt means when said shaft means is prevented from rotating so as to permit relative rotational movement between said members while said securing means maintains the thus relatively rotatable members in said aligned assembled relation thereof.

2. A pulley construction as set forth in claim 1 wherein said securing means of said other member comprises opening means passing therethrough, said part of said securing means of said one member extending through said opening means.

3. A pulley construction as set forth in claim 2 wherein said part of said securing means of said one member is integral and one-piece with said one member.

4. A pulley construction as set forth in claim 3 wherein said one member is formed of rigid polymeric material.

5. A pulley construction as set forth in claim 4 wherein said one member comprises said body member.

6. A pulley construction as set forth in claim 2 wherein said opening means of said other member comprises a plurality of spaced apart openings and said part of said securing means of said one member comprises a plurality of parts respectively extending through said openings.

7. A pulley construction as set forth in claim 6 wherein said other member has an inner peripheral means and an outer peripheral means, said opening means being disposed intermediate said inner peripheral means and said outer peripheral means.

8. A pulley construction as set forth in claim 6 wherein said other member has an inner peripheral means and an outer peripheral means, said opening means comprising a plurality of slots that respectively interrupt one of said peripheral means of said other member.

9. A pulley construction as set forth in claim 2 wherein said one member comprises said body member, said body member having an inner annular peripheral means provided with annular slot means therein that comprises said securing means thereof, said hub member having an outer annular peripheral means disposed in said slot means, said part of said securing means of said body member bridging said slot means thereof.

10. A pulley construction as set forth in claim 9 wherein said hub member comprises a flat disc-like plate.

11. In a drive system comprising a pulley construction, a shaft means, and a driven endless belt means, said pulley construction comprising a body member having a peripheral groove means therein receiving part of said belt means therein and having securing means, and a hub member having securing means secured to said securing means of said body member so as to hold said members in aligned assembled relation to rotate in unison, said hub member having means interconnected to said shaft means so that said pulley construction and said shaft means will rotate in unison as said belt means drives said pulley construction, the improvement wherein said securing means are so constructed and arranged that said securing means of one of said members has a part thereof that is adapted to break away from said one member under a certain normal driving force of said belt means when said shaft means is prevented from rotating so as to permit relative rotational movement between said members while said securing means maintains the thus relatively rotating members in said aligned assembled relation thereof as said belt means continue to rotate said body member relative to said hub member.

12. A drive system as set forth in claim 11 wherein said securing means of said other member comprises opening means passing therethrough, said part of said securing means of said one member extending through said opening means.

13. A drive system as set forth in claim 12 wherein said part of said securing means of said one member is integral and one-piece with said one member.

14. A drive system as set forth in claim 13 wherein said one member is formed of rigid polymeric material.

15. A drive system as set forth in claim 14 wherein said one member comprises said body member.

16. A drive system as set forth in claim 12 wherein said opening means of said other member comprises a plurality of spaced apart openings and said part of said securing means of said one member comprises a plurality of parts respectively extending through said openings.

17. A drive system as set forth in claim 16 wherein said other member has an inner peripheral means and an outer peripheral means, said opening means being disposed intermediate said inner peripheral means and said outer peripheral means.

18. A drive system as set forth in claim 16 wherein said other member has an inner peripheral means and an outer peripheral means, said opening means comprising a plurality of slots that respectively interrupt one of said peripheral means of said other member.

19. A drive system as set forth in claim 12 wherein said one member comprises said body member, said body member having an inner annular peripheral means provided with annular slot means therein that comprise said securing means thereof, said hub member having an outer annular peripheral means disposed in said slot means, said part of said securing means of said body member bridging said slot means thereof, said hub member comprising a flat disc-like plate.

20. In a method of making a pulley construction for use with an endless drive belt means, said method comprising the steps of forming a body member with a peripheral groove means therein for receiving part of said belt means therein and with securing means, forming a hub member with securing means, securing said securing means of said hub member to said securing means of said body member so as to hold said members in aligned assembled relation to rotate in unison, and forming said hub member with means for being interconnected to a shaft means so that said pulley construction and said shaft means will be adapted to rotate in unison, the improvement comprising the step of forming said securing means so that said securing means of one of said members has a part thereof that is adapted to break away from said one member under a certain normal driving force of said belt means when said shaft means is prevented from rotating so as to permit relative rotational movement between said members while said securing means maintains the thus relatively rotatable members in said aligned assembled relation thereof.

* * * * *